United States Patent Office 3,700,541
Patented Oct. 24, 1972

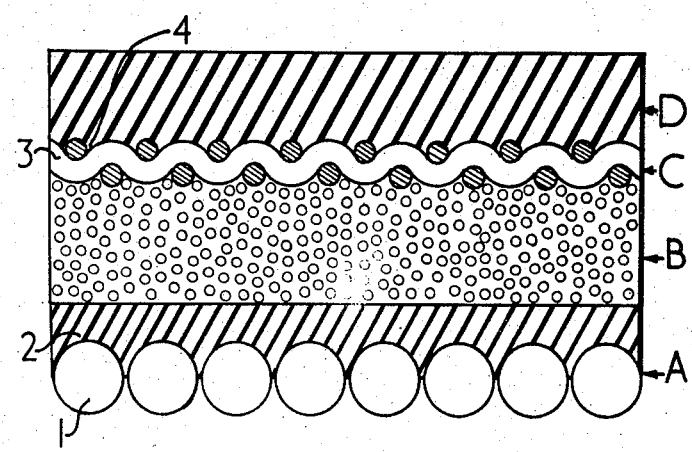

3,700,541
PRINTERS' BLANKETS
Ronald Horace Shrimpton, Lichfield and Keith William Dunkley, Birmingham, England, assignors to Dunlop Holdings Limited, London, England
Filed Apr. 5, 1971, Ser. No. 131,142
Claims priority, application Great Britain, Apr. 11, 1970, 17,303/70; June 24, 1970, 30,611/70
Int. Cl. B32b 3/26, 5/16
U.S. Cl. 161—160                      17 Claims

ABSTRACT OF THE DISCLOSURE

A printers' blanket comprises a printing surface, at least one strengthening layer and, between the surface and the layer, a compressible layer of a cellular resilient polymer the cells of which have been produced by incorporation of hollow microspheres in the polymer.

---

This invention relates to printers' blankets.

An object of this invention is to construct a printers' blanket having desirable characteristics for high speed off-set printing operations. A blanket for use in such operations may suitably include a compressible layer of a resilient polymer. Purposes for such a compressible layer are (a) to prevent "blurring" or lack of definition of the printed image caused by a small standing wave in the blanket printing surface adjacent to the nip of the printing press, (b) to absorb a "smash" i.e. a temporary increase in the thickness of the material to be printed, e.g. the accidental introduction of more than one sheet of paper during the printing operation, without resulting in permanent damage to the blanket or impairment of the printing quality of the blanket, and (c) to maintain the evenness of the printing surface and the thickness of the blanket during the printing operation by restoring the normal thickness of the blanket after compression at the nip of the press. The compressible layer may suitably comprise a cellular resilient polymer and it is found to be preferable for the cells or voids in the layer to be discrete microcells. A particularly advantageous compressible layer is now found to be one made by producing cells or voids in a resilient polymer by incorporation of hollow microspheres in the polymer.

According to the present invention there is provided a printers' blanket which includes a compressible layer of a cellular resilient polymer the cells of which have been produced by the incorporation of hollow microspheres in the polymer.

Suitably, the hollow microspheres should be resilient and/or frangible on compression. However, the microspheres should be strong enough to resist breakage during their incorporation into the polymer. When the microspheres are frangible so that they leave voids in the polymer when they break, it is preferred that they should have thin walls so that the residual material of the microspheres after crushing does not interfere to an undesirable extent with the resiliency of the cellular polymer. Preferred hollow microspheres are those of glass, phenolic resin, carbon or thermoplastic material.

Hollow thermoplastic microspheres may suitably be made by producing particles of a thermoplastic material containing a vaporizable material and then subjecting the particles to conditions, such as heat, at which the vaporizable material vaporizes to expand the particles into hollow microspheres. The vaporization of the vaporizable material is preferably performed before mixing the particles with the polymer but may be performed after incorporation of the particles in the polymer. In the latter case, the vaporization may, if desired, be accompanied by partial or complete curing of the polymer under the conditions of vaporization; however, in this case the vaporization rate should preferably be greater than the rate of cure of the polymer. The thermoplastic material may suitably be a copolymer of acrylonitrile and vinylidene chloride, and the vaporizable material may suitably be a liquid such as liquified isobutane. The size of the expandable particles will be smaller than that of the hollow microspheres produced from them and a particle diameter:corresponding microsphere diameter ratio of about 1:4, giving a volume ratio of about 1:50, has been found to be suitable. A suitable expandable particle diameter may be from about 0.003 to about 0.03 mm.

The cells, and correspondingly the microspheres, in a compressible layer are preferably of substantially the same small size and are preferably uniformly distributed in the polymer. A suitable microsphere diameter may be from about 0.0125 to about 0.125 mm., especially from about 0.0125 to about 0.05 mm., and the microspheres may suitably be incorporated to an extent of from about 10 to about 40 percent, preferably from 20 to 30 percent, by volume of the polymer plus microspheres.

The word "polymer" as used herein includes a composition of a polymer with the usual polymer additives. Examples of such additives are processing, stabilizing, strengthening and curing additives. The additives may constitute for example up to about 50 percent by volume of the polymer.

A preferred method of incorporating the microspheres or expandable particles in the polymer is by dry-milling or by dispersing them in a dough of the polymer, e.g. a 1/1 polymer/solvent dough. The mill nip should not be so narrow that the microspheres are crushed and should not be so wide that the microspheres are poorly dispersed in the polymer.

Preferably the presence of water is avoided during the incorporation in order to avoid water vapor "blowing" during any subsequent heating of the polymer e.g. during curing of the polymer or, in the case of expandable particles, during vaporization of the vaporizable material in the particles. For this reason the microspheres or expandable particles are preferably dried before mixing with the polymer, and a dehydrating agent, e.g. calcium oxide, may be included in the mixture.

After incorporation of the microspheres or expandable particles in the polymer, the mixture may be cast or spread in a layer of a desired thickness for the compressible layer and allowed or caused to set, typically by curing the polymer. The mixture may be cast or spread directly onto another layer to be included in the blanket, e.g. a strengthening layer, or may be cast or spread onto a release-surface and subsequently assembled into the blanket construction. Curing or other setting of the polymer may take place before or after assembly of the compressible layer with the other blanket layers. When the cast or spread layer contains expandable particles, the layer should be treated, e.g. heated, to expand the particles into microspheres prior to the setting of the layer. The conditions of vaporization to achieve expansion may also cause the mixture to at least partially set, e.g. by curing the polymer.

The polymer for use in the compressible layer should be resilient and a preferred polymer is a low set, high modulus elastomer. The compressible layer preferably has a minimum compression modulus of 3.1 kg./sq. cm. for a 0.25 mm. compression and should also preferably be resistant to attack by solvents normally present in printing inks and solvents normally used for washing the blanket after use. A suitable polymer for use in the compressible layer is polychloroprene or a nitrile polymer. The compressible layer may suitably have a thickness of from 0.25 to 0.75 mm.

In addition to the compressible layer the printers' blanket suitably has at least one strengthening layer and a printing surface. The strengthening layer or layers are preferably on the opposite side of the compressible layer from the printing surface and are preferably immediately next to the compressible layer. It is found to be desirable for the strengthening layer or layers to have a compression modulus which is higher than that of the compressible layer and for the number of strengthening layers to be kept to a minimum. Preferably only one strengthening layer is employed and a particularly preferred strengthening layer is one comprising flexible textile filamentary members embedded in a flexible polymer composition.

The filamentary members in the strengthening layer(s) may be monofilaments (including those of substantially flat cross-section such as are made by slitting a film and those of substantially circular cross-section such as are made by extrusion or by twisting flat monofilaments), yarns of monofilaments or cords of monofilaments, which are preferably uniplanar and parallel to the lengthwise direction of the blanket i.e. parallel to the curved surface of the printing cylinder on which the blanket is fitted for use, and preferably they are minimally spaced and may be touching. They are preferably non-woven but may be in the form of a "weftless" fabric i.e. a number of aligned filamentary members (warp) retained in sheet form by the minimum amount of fine threads (weft), in order to hold the filamentary members together during the manufacture of the blanket. Particularly suitable filamentary members have been found to be those of cotton, carbon, rayon, polyester, nylon, polypropylene and glass. In the case of a "weftless" fabric the weft threads may suitably be of, for example, bulked nylon.

The strengthening layer(s) may suitably have a tensile strength of at least 80 kg. per cm. width and an elongation of from 0.7 to 1.5 percent, especially about 1.0 percent, at a load of about 10 kg. per cm. width and may suitably show a strain of approximately one percent at a load of about 10 kg. per cm. width. A 0.7 percent strain is considered to be the minimum strain required to pull out any structural irregularities in a blanket and a load of about 10 kg. per cm. width is the load which is usually needed to produce such a strain when the blanket is tensioned on a printing cylinder. The number of ends of filamentary members per cm. should preferably be the maximum practicable and the denier of the filamentary members should preferably be the minimum practicable consistent with providing the strengthening layer(s) with the above elongation and tensile properties. For glass filamentary members of about 0.175 mm. diameter a suitable number of ends per cm. has been found to be about 20, and for rayon filamentary members of about 1650 denier a suitable number of ends per cm. has been found to be about 16.

The above preferred characteristics of the strengthening layer(s) are desirable in order to minimize the undesirable effect of "print-through" i.e. the reproduction on the printing surface during a printing operation of the filamentary pattern where the weft crosses the warp.

In addition to the filamentary members, the strengthening layer(s) may comprise a flexible polymer composition which is preferably a high modulus, high resilience, low set elastomer composition. The filamentary members may be completely or only partially embedded in the composition. The polymer composition preferably has a compression modulus in the thickness direction of the blanket which is as close as possible to the compression modulus of the filamentary members embedded in it, in order to further decrease the risk of "print-through." Preferably also, the polymer compositon is resistant to attack by solvents used in printing inks and solvents used to wash the blanket after use. The polymer composition may suitably be a high modulus, high resilience, low set blend of a rubber and a plastic material. An especially suitable rubber is found to be a nitrile rubber and an especially suitable plastic material is found to be polypropylene or nylon. The amount of polypropylene or nylon in the blend may suitably be at least 10 parts by weight, and preferably from 30 to 70 parts by weight, per 100 parts by weight of nitrile rubber. The polymer composition may suitably have a compression modulus greater than 3.1 kg./sq. cm. for a 0.25 mm. compression.

The strengthing layer(s) may have a thickness of, for example, from 0.375 to 1.0 mm. and the strengthening layer face furthest from the compressible layer may have a low coefficient of friction to facilitate the fitting of the blanket onto a printing cylinder.

A preferred strengthening layer is described in the complete specification of U.K. patent application No. 61,142/69 and U.S. patent application Ser. No. 96,448.

The printing surface may be in the form of a veneer conventionally employed in printers' blankets, although a veneer having a lower hardness than has been conventionally employed is preferred. It is found that the printing veneer may suitably have a hardness of about 60 to 70 BS° and the strengthening layer(s) of the blanket may suitably have a hardness of about 80 to 92 BS°. A suitable material for the printing veneer is a solvent-resistant elastomer, e.g. nitrile rubber. The printing veneer may have a thickness of, for example, from 0.25 to 0.625 mm.

The blanket may suitably also include a thin textile fabric layer and/or a high modulus rubber film layer positioned between the compressible layer and the printing veneer of the blanket. A purpose of such a fabric and/or film layer may be to absorb transverse stresses created in the blanket printing surface during a printing operation. When a fabric is employed it should preferably be of high count, e.g. above 30 ends per cm., so as to reduce the risk of "print-through" and a suitable fabric is found to be "cambric" or "sheeting." If desirsed, the fabric may be impregnated with the polymer composition employed in the printing veneer. When a high modulus rubber film is employed it may suitably be of a blend of a rubber and a plastic material e.g. a blend of a nitrile rubber and polypropylene. The textile fabric or rubber film layer may have a thickness of, for example, from 0.125 to 0.25 mm.

One embodiment of a printer's blanket construction in accordance with this invention is shown by way of example only in the accompanying diagrammatic cross-sectional drawing in which:

A represents a strengthening layer having a thickness of e.g. 0.65 mm. and consisting of a layer of flexible textile filamentary members 1, e.g. rayon cords, partially embedded in the surface of a flexible polymer composition 2, e.g. a blend of nitrile rubber and polypropylene or nylon;

B represents a compressible layer having a thickness of e.g. 0.625 mm. and consisting of a microcellular resilient polymer, e.g. a microcellular nitrile rubber, containing uniformly distributed microcells produced by the incorporation of hollow microspheres in accordance with this invention;

C represents a textile fabric layer 3, having a thickness of e.g. 0.175 mm. and consisting of e.g. about 40 warp ends per cm. impregnated with a polymer composition 4 which may be the same as that of the printing surface, e.g a nitrile rubber composition; and D represents a printing surface in the form of a veneer of a solvent-resistant elastomer, e.g. a nitrile rubber composition, having a thickness of e.g. 0.45 mm.

The compressible layer may be conveniently made by uniformly incorporating 30 parts by volume of dried fine hollow microspheres of, for example, glass, phenolic resin, carbon or acrylonitrile/vinylidene chloride copolymer, none having a diameter of more than 0.125 mm., in 70 parts by volume of the polymer (containing about 50 percent by volume of actual polymer and which may include a small amount e.g. about 5 parts by weight of quicklime), spreading the mixture to give a final thickness of 0.625 mm. on the strengthening layer, and curing the polymer at 140° C. for 90 minutes in situ between the strengthening layer and the impregnated high count textile fabric plus printing veneer. The uniformity of distribution of the microspheres in the compressible layer ensures an even thickness of the layer within the acceptable thickness tolerance of ±1 percent.

A compressible layer in accordance with this invention having discrete microcells has particularly effective self-restoration properties owing to the effect of "pillars" of polymer between the microcells and to the resiliency of the microspheres and probably to the pneumatic effect of gas or vapor trapped in the microcells. It is found that blowing techniques for producing cells in a polymer are unable to produce the uniformity of cell size, the smallness of cell size, the thickness of the polymer "pillars" between the cells and the low thickness tolerance of layers produced by hollow microspheres in accordance with the present invention. It is also found that leaching techniques for producing cells in a polymer are unable to produce liquid-impermeable sheets and, because the cells are necessarily interconnecting, the cell walls tend to be thin and therefore no "pillar" effect is possible. Also leaching techniques are not as convenient as the cell-forming technique of the present invention.

The printers' blankets of this invention may suitably have a tripsometer resilience of not less than 30 percent and a compression set of not greater than 30 percent when measured immediately after release from a compression of up to 0.25 mm. maintained for up to 30 minutes.

Having now described our invention, what we claim is:

1. A laminated printers' blanket comprising a printing surface, at least one strengthening layer and a compressible layer of a cellular resilient polymer between the printing surface and the strengthening layer, the cells of the cellular resilient polymer including hollow microspheres in the polymer matrix.

2. A printers' blanket according to claim 1 in which the microspheres have a diameter of from 0.0125 to 0.125 mm.

3. A printers' blanket according to claim 1 in which the amount of microspheres incorporated in the polymer is from 10 to 40 percent by volume of the polymer plus microspheres.

4. A printers' blanket according to claim 1 in which the microspheres are selected from the group consisting of resilient and frangible microspheres.

5. A printers' blanket according to claim 1 in which the cells are of substantially the same size and are substantially uniformly distributed in the polymer.

6. A printers' blanket according to claim 1 in which the polymer is selected from the group consisting of polychloroprene and nitrile rubber.

7. A printers' blanket according to claim 1 in which the strengthening layer comprises flexible textile filamentary members embedded in a flexible polymer composition.

8. A printers' blanket according to claim 7 in which the flexible polymer composition of the strengthening layer comprises a blend of a nitrile rubber and a material selected from the group consisting of polypropylene and nylon.

9. A printers' blanket according to claim 1 which comprises a plurality of strengthening layers.

10. A printers' blanket according to claim 1 in which the printing surface is in the form of a veneer of a nitrile rubber.

11. A printers' blanket according to claim 1 which additionally comprises a thin layer of material selected from the group consisting of textile fabric and rubber film layers between the compressible layer and the printing surface which is in the form of an elastomeric veneer.

12. A printers' blanket according to claim 1 in which the microspheres are of a material selected from the group consisting of glass, thermoplastic material, phenolic resin and carbon.

13. A printers' blanket according to claim 12 in which the thermoplastic material is a copolymer of acrylonitrile and vinylidene chloride.

14. A printers' blanket according to claim 1 in which the compressible layer has a thickness of from 0.25 to 0.75 mm., the strengthening layer has a thickness of from 0.375 to 1.0 mm., and the printing surface is in the form of an elastomeric veneer having a thickness of from 0.25 to 0.625 mm.

15. A printers' blanket according to claim 7 in which the filamentary members in the strengthening layer are uniplanar and parallel to the lengthwise direction of the blanket.

16. The printers' blanket according to claim 11 wherein said thin layer has a thickness in the range of 0.125 to 0.25 mm.

17. The printers' blanket according to claim 1 wherein said hollow microspheres comprise resilient thermoplastic hollow microspheres.

References Cited
UNITED STATES PATENTS

| | | | |
|---|---|---|---|
| 1,778,185 | 10/1930 | De Vries | 161—401 |
| 2,099,024 | 11/1937 | Lewis | 161—401 |
| 2,792,322 | 5/1957 | Fredericks | 161—401 |
| 3,046,172 | 7/1962 | Reid | 161—160 |
| 3,515,625 | 6/1970 | Sedlak et al. | 161—168 |

WILLIAM J. VAN BALEN, Primary Examiner

U.S. Cl. X.R.

161—162, 168, 401, Dig. 5

Disclaimer 3,700,541.—*Ronald Horace Shrimpton*, Lichfield, and *Keith William Dunkley*, Birmingham, England. PRINTERS BLANKETS. Patent dated Oct. 24, 1972. Disclaimer filed Sept. 16, 1974, by the assignee, *Dunlop Holdings Limited*.

Hereby disclaims the entire remaining term of said patent.

[*Official Gazette June 10, 1975.*]